United States Patent [19]
Asawa et al.

[11] Patent Number: 5,818,986
[45] Date of Patent: Oct. 6, 1998

[54] ANGULAR BRAGG REFLECTION PLANAR CHANNEL WAVEGUIDE WAVELENGTH DEMULTIPLEXER

[76] Inventors: Charles K. Asawa; Mike H. Asawa; Jane K. Asawa, all of 16766 Bollinger Dr., Pacific Palisades, Calif. 90272-3218

[21] Appl. No.: 729,852

[22] Filed: Oct. 15, 1996

[51] Int. Cl.⁶ .................................................. G02B 6/26
[52] U.S. Cl. ............................. 385/24; 385/37; 385/14; 385/45
[58] Field of Search .................................. 385/14, 37, 24, 385/10, 18, 45, 47, 129, 130, 131, 132

[56] References Cited

U.S. PATENT DOCUMENTS

| | | | |
|---|---|---|---|
| 4,740,951 | 4/1988 | Lizet et al. | 385/14 |
| 5,064,263 | 11/1991 | Stein | 385/14 |
| 5,664,032 | 9/1997 | Bischel et al. | 385/4 |

*Primary Examiner*—John Ngo

[57] ABSTRACT

An optical planar waveguide wavelength division demultiplexer for separating multiple wavelengths received in a wavelength division multiplexed communication system is disclosed, with each wavelength launched into a separate output waveguide channel. Wavelength separation is performed by wavelength-selective angular back-reflection from Bragg gratings, which are fabricated into the channel junctions of the planar germania-enriched silica waveguide by applying short wavelength light past a mask. A second Bragg reflection, reflecting the same wavelength as the first Bragg grating, is introduced into each output channel circuit, in order to attenuate residual backscattered light at non-desired wavelengths. The Bragg grating is extended beyond the channel junctions into the merged channel for greater reflectivity, if required, for the double Bragg grating geometry. Two planar waveguide geometries are shown: An asymmetric geometry where the output channels merge on either side of a straight input channel, and a symmetric geometry where the input and output channels merge symmetrically with respect to an arbitrary center line.

19 Claims, 3 Drawing Sheets

DOUBLE FILTERING

ANGULAR BRAGG REFLECTION PLANAR CHANNEL WAVEGUIDE WAVELENGTH DEMULTIPLEXER

BACKGROUND OF THE INVENTION

BACKGROUND—FIELD OF INVENTION

This invention relates generally to optical fiber communication systems where light of many different optical wavelengths in a fiber carries information to the receiver, where each wavelength contain different information. More specifically, this optical wavelength demultiplexer invention relates to planar waveguide devices and methods for separating the individual wavelengths into different waveguide channels at the receiver in order to separately detect the different wavelength information.

BACKGROUND—PURPOSE

The bandwidth capacity of optical fibers at the low-loss bands at 1310 nm and 1550 nm can be readily estimated to be about 14,000 Ghz and 15,000 Ghz, respectively. Currently, fiber optic channel capacity is under-used. The use of only one wavelength limit the bandwidth to about 10 or 20 Ghz, based on current modulation capabilities, so that only about 0.1% of the bandwidth capacity is used. Further, most systems do not use these higher frequencies, so that the available bandwidth use is extremely small.

Despite the high capacity of an optical fiber channel, most systems use only one wavelength in a fiber for carrying information. Optical fibers have relatively broad regions of low loss that could support the operation of the link with more than one optical source. Since we have the ability to control the operating wavelength of the semiconductor emitter through the alloy composition or through the grating spacing in the distributed-feedback lasers or distributed Bragg reflector lasers, it is possible to consider a link that would carry several wavelengths. At the receiving end, beamsplitters, filters, or other wavelength-sensitive components such as gratings, would separate the wavelengths and each carrier would fall on a separate receiver for detection. Since many wavelengths would share the optical fiber channel, the technology has been called wavelength division multiplexing.

The key elements in such a link are the devices that combine the separate sources, the optical wavelength multiplexers, at the transmitter end, and the devices that separate the optical wavelengths, the optical wavelength demultiplexer, at the receiver end.

BACKGROUND—PRIOR ART

Optical wavelength demultiplexers have been, and are being, constructed of discrete components. One method is the use of a sequence of discrete filters and lenses. The first filter transmits one wavelength and a lens focuses the transmitted light to a detector. All other wavelengths are reflected by the first filter to a second filter, where a second wavelength is filtered and detected. The reflected light is reflected to a third filter. By continuing the sequence, all wavelengths are detected by separate detectors. This demultiplexer is costly to manufacture since discrete filters and components are expensive and alignment of the component holder is time-consuming.

Grating demultiplexers have been fabricated, but these demultiplexers are inherently lossy since optical matching of apertures are required.

An integrated optics form of demultiplexer uses a tunable Mach-Zehnder interferometer or a directional coupler in titanium waveguides fabricated in lithium niobate, as described by S. K. Korotky and R. C. Alferness on pp. 421–465, Optical Fiber Telecommunications II, edited by S. E. Miller and I. P. Kaminow, Academic Press, 1988. But titanium waveguide channel losses as well as losses due to waveguide mismatch of the titanium waveguide to the fiber core waveguide result in high losses, and therefore such a demultiplexer is limited to specific applications. A broadband, all-fiber Mach-Zehnder filter with an identical chirped Bragg grating in each arm of the interferometer has been demonstrated, as described by F. Bilodeau, K. O. Hill, S. Theriault, B. Malo, J. Albert, and D. C. Johnson in Paper WF5, Technical Digest, Optical Fiber Communication Conference, Feb. 25–Mar. 1, 1996, San Jose, Calif., but have a large bandwidth of about 15 nm and is cumbersome for multiple wavelength demultiplexing.

The directional coupler's resolution depends, not only on its length, but on the index difference of the channels, and, therefore, depends upon the ability to make waveguides with large values of waveguide substrate index difference beyond that available with titanium waveguides in lithium niobate. A resolution of 70 nm has been demonstrated, but this is far greater than the 2–3 nm separation of wavelength components of projected standard wavelength division multiplexing systems.

Demultiplexers, integrated with sources and detectors, have been demonstrated in III–IV compounds, but the waveguides in these compounds are excessively lossy.

Bragg Reflectors

Our optical demultiplexer uses ultraviolet-light-induced Bragg grating reflectors in a specially designed planar waveguide germania-silica channels. The back-reflected light waves from the Bragg gratings, which are fabricated at a slight angle with respect to the waveguide channel, are split into separate waveguide channels.

A brief background note on the Bragg grating and its fabrication in optical fiber is given here:

Brief history

K. O. Hill and his colleagues first observed a photoinduced grating in a germania-doped optical fiber core, as described in Applied Physics Letters 32, pp. 647–649, 1978. Hill's grating was made in the fiber core by a standing wave of 488 nm argon laser light. The grating exposure in this case was shown to be a two-photon process.

Ten years of relative inactivity in the field followed. A major advance in grating formation was made in the late 1980's by Meltz and his colleagues, as described in Optics Letters 14, pp. 823–825, 1989. They formed a grating with transverse side exposure of a fiber core with an holographic interference pattern formed with an intense krypton fluoride laser source. The UV exposure at 248 nm formed transverse spatial index modulation or phase grating in the fiber core. The UV exposure gave a single-photon process with an enhancement of a million times in the photosensitivity of the grating writing process compared to the use of the 488 nm argon laser light.

The wavelength band of Bragg grating reflection has been demonstrated to be very narrow: of the order of 0.2 to 0.5 nanometers, as described by W. W. Morey an his colleagues in Optics & Photonics News, pp. 8–14, February 1994.

Studies have shown that the photoinduced gratings are permanent and are produced by a refractive index change with little or no absorption or scattering loss at the optical fiber communications band wavelengths. The change of refractive index is very small: of the order of $10^{-5}$ to $10^{-4}$, but may be made much larger.

The detailed process for generating the index change is not completely understood. Basically, the inducing UV radiation breaks certain bonds in the glass structure like the oxygen-vacancy-defect bonds in germania-doped silica. Electrons are set free and find their way to color center traps elsewhere in the structure. The new electron traps are deep and change the absorption properties of the doped silica, principally in the UV portion of the spectrum. The positive net change in the absorption spectrum causes an increase in the refractive index out through the near infrared spectrum, as described by the Kramers-Kronig dispersion relationship.

SUMMARY: OBJECTS AND ADVANTAGES OF OUR INVENTION

Our optical demultiplexer uses ultraviolet light-induced Bragg grating reflectors at the reflection junctions of input and output channels of a planar germania-silica waveguide, where back-reflected light waves of different wavelengths are split angularly into separate output waveguide channels.

We find that:

(1) Bragg back-reflection at an angle by Bragg gratings at reflection junctions of the input channel and the output channels of a planar waveguide will allow selective and efficient wavelength separation of each wavelength signal of a received multiple-wavelength optical signal into separate optical waveguide channels.

(2) The Bragg gratings at the reflection junctions are integrated into the waveguide channel junctions. Photolithographic fabrication of planar germanium-silica waveguide and Bragg grating fabrication technology permit efficient and low cost, batch process fabrication of our wavelength demultiplexer.

(3) The versatility of the optical wavelength demultiplexer is increased by varying the period, or pitch, of the Bragg grating, which allows optical reflection wavelengths and bandwidths to be changed.

(4) Double filtering of each wavelength is readily accomplished with a second Bragg grating inserted in each output channel. Double filtering will attenuate any residual backscattered light at other wavelengths occurring at following reflection junctions. Bragg gratings may extend beyond the reflection transitions.

(5) The versatility of the optical wavelength demultiplexer is increased by local heating of the Bragg grating. The Bragg reflection wavelength may be tuned by selective, local heating of the Bragg grating by electrical resistive heating at the surface of the planar waveguide in the vicinity of the Bragg grating, thereby changing the periods of the grating due to refractive index change and length change of the waveguide with temperature. The heater element is photolithographically applied on the planar waveguide near the Bragg grating.

Further objects and advantages of our invention will become apparent from a consideration of the drawings and ensuing description.

DESCRIPTION OF THE PREFERRED EMBODIMENTS

Our optical demultiplexer uses ultraviolet light-induced Bragg grating reflectors in planar germania-silica waveguides, where back-reflected light waves of different wavelengths are split into separate waveguide channels, for selective detection of light at each wavelengths. The planar waveguide channel reflection junction is designed such that the Bragg grating at the reflection junction will reflect the selected wavelength into an output waveguide channel.

Figure 1:
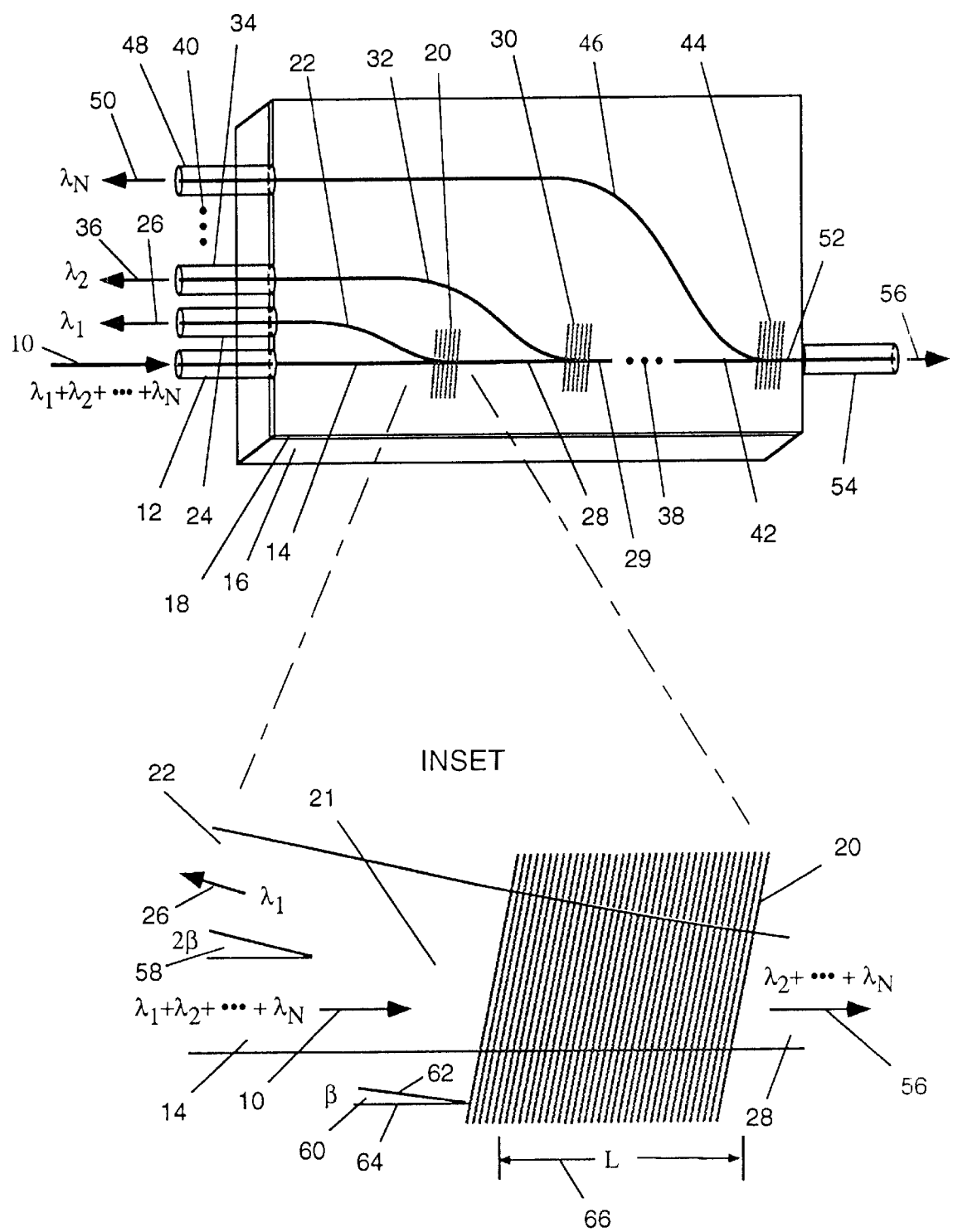
FIG. 1 is a diagram of an optical planar waveguide wavelength division demultiplexer for separating multiple wavelengths received in a wavelength division multiplexed communication system into separate waveguide channels. Wavelength separation is performed by wavelength-selective back-reflection from Bragg gratings which are fabricated into the channel junctions of the planar germania-enriched silica waveguide. The inset illustrates the angular Bragg back-reflection of light at one wavelength into an output waveguide channel; the input light containing multiple wavelengths propagates along a straight channel and the back-reflection channel is located at an angle $2\beta$ with respect to the straight channel. The Bragg grating normal is inclined at an angle $\beta$ for selective Bragg back-reflection into the angle-offset channel. The back-reflection channel may be located on either side of the straight channel with proper Bragg grating angular tilt. The Bragg grating is fabricated into the germanium-enriched silica waveguide planar waveguide at the waveguide junctions by ultra-violet radiation of the waveguide, where the grating period is determined by a mask placed between the ultra-violet source and the waveguide.

In FIG. 1 a planar channel waveguide and Bragg gratings are shown. The received light 10, at N different wavelengths, $\Lambda_1$ to $\Lambda_N$, enters fiber 12 and then germania-silica waveguide 14 of the planar waveguide 18, which is formed on a silicon substrate 16. The planar waveguide can be custom-fabricated by a commercial foundry to any design. The commercial process for waveguide fabrication is as follows: The silica glass planar waveguide is formed on a silicon substrate by flame hydrolysis deposition. Porous-glass, or "soot", produced by flame hydrolysis deposition of halide materials such as $SiCl_4$, $GeCl_4$, etc., is deposited directly on the silicon wafer. After deposition, the wafers are heated to a high temperature for "consolidation" into vitreous glass. The refractive index is controlled precisely by changing the flow rate of the halides. The thickness of the glass layer is also controlled to within 2%.

Germanium-enriched channel waveguides are formed by a combination of photolithographic patterns and reactive ion etching. Amorphous silicon is used as the mask material for etching the germanium-enriched silica glass into channels. Channels with vertical and smooth sidewalls are obtained by selection of suitable etching conditions. The channel waveguides are then covered with porous silica soot and then consolidated, to form the upper and surrounding cladding.

The germania concentration of the waveguide channel need to be 10 mol % or more in order to form Bragg gratings in the channel. The dopant level determines the number of defect sites in the material, where more defect sites increase the photosensitivity to UV radiation and hence the refractive index. Germania dopant levels up to 20% are possible.

The inset of FIG. 1 shows some details of a planar waveguide channel geometry. The ultraviolet light-induced Bragg grating 20 is positioned at the waveguide channel reflection junction 21 where input channel 14 meets output channel 22. In the inset the normal 62 to grating 20 is inclined at an angle β with respect to a line 64 parallel to the axis of waveguide channel 14. Light 26 at wavelength $\lambda_1$ is reflected by Bragg grating 20 into channel 22 inclined at an angle 58 of 2β. The wavelength reflected depends upon the grating period. The length 66 of Bragg grating 20 is indicate by L. Light 56 at the remaining wavelengths is transported by waveguide channel 28 to grating 30 where light 36 at wavelength $\lambda_2$ is reflected into planar waveguide channel 32 and then into fiber 34. Light at the remaining wavelengths is transported by channel 29 to the other Bragg gratings where a similar process split light at wavelengths $\lambda_3$ to $\lambda_{N-1}$ into separate channels and output fibers, and is indicated by the pair of three dots 38 and 40. Waveguide channel 42 transports light 50 at the final wavelength $\lambda_N$, which is reflected by Bragg grating 44 into waveguide channel 46 and then into fiber 48 to the final optical detector or for further processing. Any residual light 56, not completely reflected by the Bragg gratings, is transported by waveguide channel 52 to fiber 54 to an optical detector or to a spectrometer for examining the residual light.

Figure 2:
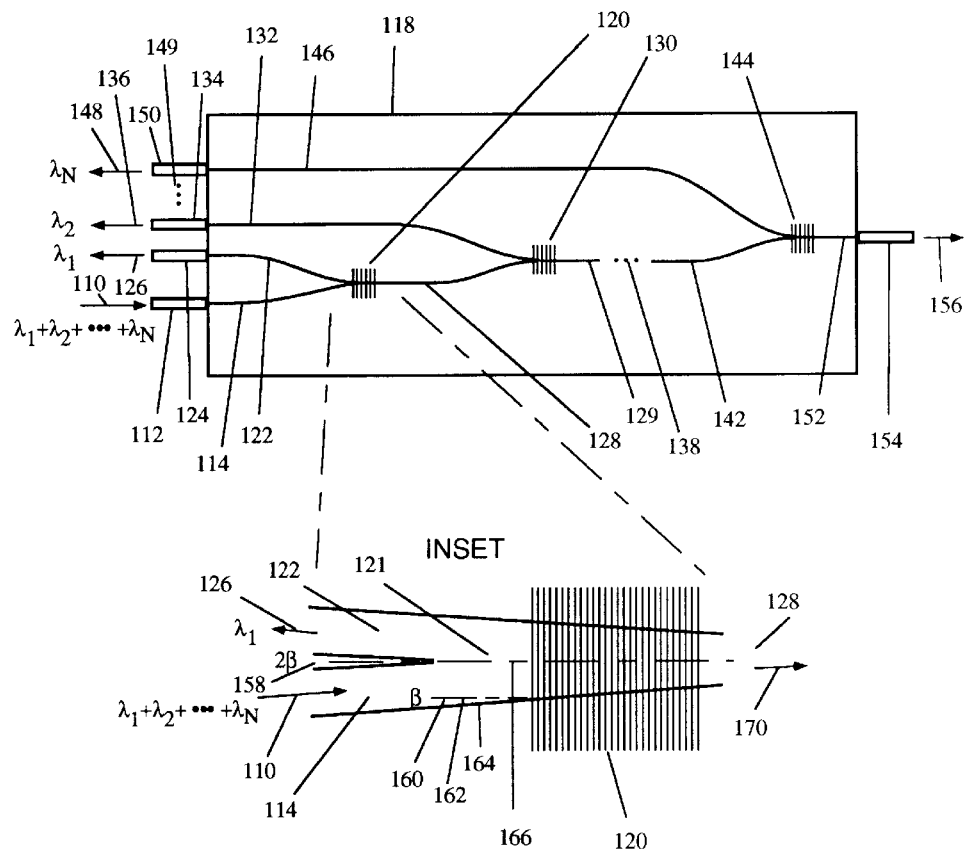
FIG. 2 is a diagram of an optical planar waveguide wavelength division demultiplexer with the same function as in FIG. 1, except that the input channel waveguide and the back-reflection channel waveguide is symmetrically located with respect to an arbitrary centerline, indicated by a dot-dash line in the inset. The Bragg grating normal is aligned with the centerline. The channels may again be designed so that the output channels are on either side of the input channel.

FIG. 2 in a diagram illustrating a symmetric planar waveguide geometry for the incoming light channel and reflected light channel. Light 110 of multiple wavelengths is transported by fiber 112 and waveguide channel 114 to Bragg grating 120. In the inset the input channel 114 and output channel 122 are symmetrically oriented with respect to a center line 166. Channels 114 and 122 meet at the reflection junction 121 at an angle 158 of 2β. The normal 162 to the Bragg grating 120 is parallel to centerline 166. The normal line 162 is oriented at an angle 160 of β with respect to the boundary 164 of channel 114. Light 126 at wavelength $\lambda_1$ is reflected by grating 120 into channel 122 and then into fiber 124 to a detector or for other uses. Light at the remaining wavelengths propagate in channel 128 to Bragg grating 130, where light 136 at wavelength $\lambda_2$ is reflected into channel 132 and then into fiber 134. Light at the remaining wavelengths is transported by channel 129 to the next Bragg gratings where a similar process of splitting the different wavelengths into separate channels occurs, and is indicated by the pair of three dots 138 and 149. Finally, channel 142 transports the remaining light to Bragg grating 144, where light 148 at wavelength $\lambda_N$ is reflected into channel 146 and into fiber 150. Channel 152 and fiber 154 transports the residual light 156 to diagnostic equipment, as required.

Figure 3:
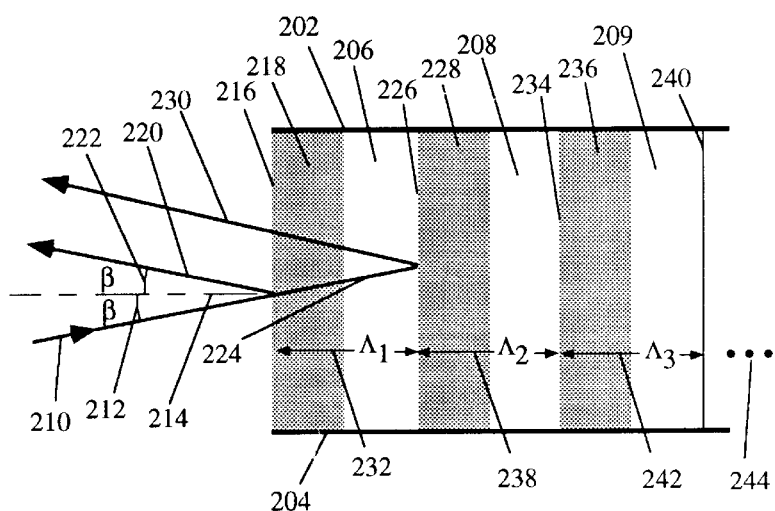
FIG. 3 is a diagram illustrating the geometry of the Bragg angle reflection condition and the separation of the Bragg grating elements. The higher refractive index induced into the germania-enriched silica waveguide channel is indicated by the shaded areas. The separations of the grating, $\Lambda_1$, $\Lambda_2$, $\Lambda_3$, etc., may be equal or may be varied systematically, in order to tune the wavelengths and bandwidths of Bragg reflection.

FIG. 3 is a diagram illustrating the geometry of the Bragg angle reflection condition and the separation of the Bragg grating elements. Line 202 and line 204 represent the surface boundaries of the waveguide junction. The third dimension of the channel is into the paper. The shaded areas 218, 228, and 236 represent the ultraviolet light-enhanced portion of the waveguide, where the refractive index of the waveguide is increased. The unshaded areas 206, 208 and 209 represent the portion of the waveguide where the refractive index remain unchanged. The sequence of high-index and low-index portions of the waveguide comprise the Bragg grating. The period of the grating is the distance between succeeding high-index and low-index portions of the Bragg grating. The periods are indicated by the longitudinal distances 232, 238, and 242, or $\Lambda_1$, $\Lambda_2$, and $\Lambda_3$, respectively. The period is the distance between the same relative positions in succeeding high-index or low-index regions. The periods may be made equal or may be varied in order to modify the characteristics of the Bragg reflection.

The classical Bragg condition for constructive Bragg reflection is shown in FIG. 3. The Bragg condition will be described for the case where the periods are the same value, denoted by $\Lambda$. Since light will be reflected at an angle in our configuration, the classical Bragg condition includes the incidence angle, β, measured with respect to the normal to the grating and is given by $$N\lambda = 2n_{av}\Lambda \cos \beta,$$

where λ is the vacuum wavelength of the communication source, N is an integer 1, 2, etc. When N=1, the Bragg grating is used in first order; when N=2, the Bragg grating is used in second order, etc. $n_{av}$ is the average refractive index of the grating, $\Lambda$ is the period of the grating, and β is the angle of incidence to the Bragg grating. The Bragg equation defines the reflection wavelength for equal Bragg periods of the optical waveguide demultiplexer. In FIG. 3 the input light 210 is inclined at an angle 212, or β, with respect to the normal 214 of the grating. Part of the light is reflected by the higher index portion 218 of the Bragg grating. The reflected light 220 is directed at an angle 222, or β, with respect the grating normal 214. Most of light 210 passes the first period of the grating and is indicated by light 224. The reflected light 230 from the second period combines with light 220 as a constructive wavefront when the Bragg equation is satisfied. In FIG. 3, for simplicity, the reflection is denoted as occurring only at the leading edges 216 and 226 of the higher index portions, whereas Fresnel reflection actually occurs at all points where the refractive index changes.

Figure 4:
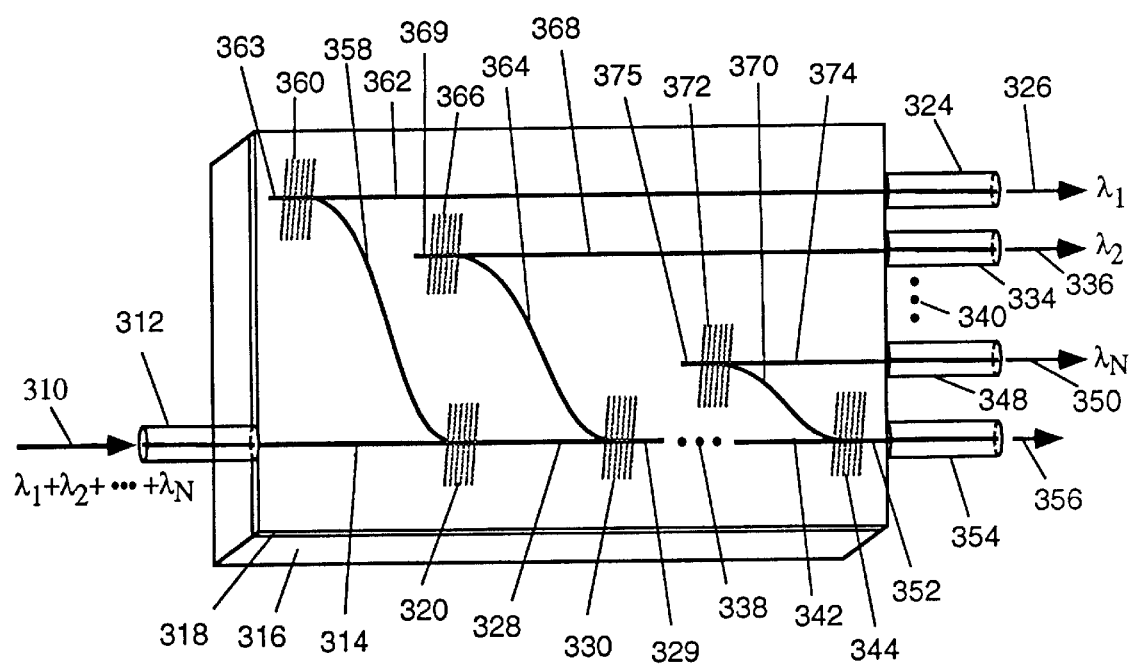
FIG. 4 illustrates a planar waveguide demultiplexer similar to that described by FIG. 1, except that output light a each wavelength undergoes a second angular reflection filtering by a Bragg grating. The purpose is to greatly attenuate any residual backscattered light at other wavelengths. Bragg gratings may extend well beyond the reflection junctions.

FIG. 4 illustrates a planar waveguide demultiplexer where the output at each wavelength undergoes double filtering in order to attenuate any residual backscattered light at other unwanted wavelengths. Light 310 at N wavelengths propagate in fiber 312 and enters channel 314 of planar germania-silica waveguide 318 fabricated upon a silicon substrate 316. At the reflection junction of channel 314 and channel 358 a Bragg grating 320 reflects the light at wavelength $\lambda_1$ into channel 358, where a second grating 360 located at the reflection junction of channel 358 and channel 362 reflects the light at wavelength $\lambda_1$ 326 into channel 362 and then into fiber 324. Waveguide 363 propagates the residual backscattered light at the other wavelengths into the silica cladding. The other wavelengths propagate in waveguide 328 to a Bragg grating 330 located at the back reflection junction of channel 328 and channel 364, where light of wavelength $\lambda_2$ 336 is reflected into channel 364, where Bragg grating 366 at the junction of channel 364 and channel 368 reflects the light at wavelength $\lambda_2$ 336 into channel 368 and then into fiber 334. Any residual backreflected light in channel 369 goes into the silica cladding. Light at the remaining wavelengths is transported by channel 329 to the other dual Bragg gratings where a similar process split light at wavelengths $\lambda_3$ to $\lambda_{N-1}$ into separate channels and output fibers, and is indicated by the pair of three dots 338 and 340. Finally, waveguide channel 342 transports light 350 at the final wavelength $\lambda_N$, which is reflected by Bragg grating 344 into channel 370 and by Bragg grating 372 into waveguide channel 374 and then into fiber 348 to the final optical detector or for further processing. Any remaining light 356, not completely reflected by the Bragg gratings, is transported by waveguide channel 352 to fiber 354 to an optical detector or to a spectrometer for examining the remaining light.

In FIG. 4 the first and second Bragg gratings may be extended well beyond the reflection junctions in the direction of the common merged channel in order to increase the reflected light at the selected wavelength; the symmetric geometry of FIG. 2 is appropriate for Bragg reflection, for the extended Bragg grating case where longer lengths of grating are required for sufficient Bragg reflection. The Bragg grating in the extended common merged channel may have a shorter grating period, or pitch, than in the reflection junction; the shorter period in the merged channel for reflecting the same wavelength as in the reflection junction, as required by the Bragg condition for angular reflection. However, with the same grating period over its entire length, the effect is a broadening of the reflection bandwidth, which will be an advantage where the source wavelength shifts with time.

It will also be appreciated that, although specific embodiments of the invention have been described in detail for purposes of illustration, various modifications may be made without departing from the spirit and scope of the invention. Accordingly, the invention is not to be limited except as by the appended claims.

ANGULAR BRAGG REFLECTION PLANAR CHANNEL WAVEGUIDE WAVELENGTH DEMULTIPLEXER

We claim:

1. An optical wavelength demultiplexer device, comprising a planar waveguide having an input waveguide channel propagating input light consisting of a plurality of different, spectrally separated wavelengths, a plurality of output waveguide channels, each of said output waveguide channels angularly merging at small acute angle with said input waveguide channel to form a junction, where each said output channel forms said junction at separate positions along said input channel, said junctions having long lengths relative to channel width, resulting from said small acute merging angles, a plurality of Bragg gratings, each located at said junction of said input waveguide channel and said output waveguide channel, normal to each said Bragg grating being parallel to bisector of said small acute angle, said junctions having long lengths permit formation of said Bragg gratings with large number of periods, resulting in long Bragg reflection junctions, each said long Bragg reflection junction reflecting light of a selected wavelength with high efficiency into said output waveguide channel due to said Bragg grating having large number of periods, said output waveguide channels located on either side of said input waveguide channel, whereby said input light in said input waveguide channel is efficiently separated spectrally in wavelengths by Bragg reflection by said Bragg gratings at said Bragg reflection junctions, with light at each wavelength directed into separate output waveguide channel.

2. Said optical wavelength demultiplexer device of claim 1, further comprising:

said input waveguide channel of said planar waveguide being a straight input channel.

3. Said optical wavelength demultiplexer device of claim 1, further comprising:

said input waveguide channel of said planar waveguide being curved.

4. Said optical wavelength demultiplexer device of claim 1, further comprising:

said output waveguide channels curving to meet an edge of the planar waveguide perpendicularly.

5. Said optical wavelength demultiplexer device of claim 4, further comprising:

detectors at the end of the output channels for detecting light propagating in said output waveguide channel.

6. Said optical wavelength demultiplexer device of claim 1, further comprising:

optical fiber pigtail connected to said input waveguide channel for propagating said input light into said input waveguide channel.

7. Said optical wavelength demultiplexer device of claim 4, further comprising:

a plurality of optical fiber pigtails, each connected to an end of said output channel of said planar waveguide for transporting said output light in said output channel to said optical fiber pigtail for further processing.

8. Said optical wavelength demultiplexer device of claim 1, further comprising:

said channels of said planar waveguide being germanium-enriched silica, said Bragg gratings induced into said junctions by means of ultraviolet light passed through a mask to induce changes in the refractive index of said junctions.

9. Said optical wavelength demultiplexer device of claim 1, further comprising:

each said Bragg grating having a constant period for first-order reflection of light of wavelength given by the Bragg equation for angular reflection.

10. Said optical wavelength demultiplexer device of claim 1, further comprising:

each said Bragg grating consisting of a mixture of period lengths for first order and higher orders reflection for each selected wavelength, as given by said Bragg equation for angular reflection and order.

11. Said optical wavelength demultiplexer device of claim 1, further comprising:

each said Bragg grating having a variable period length, for reflection of light of wavelengths over a wider wavelength range than for a Bragg grating of equal period lengths.

12. Said optical wavelength demultiplexer device of claim 1, further comprising:

each said Bragg grating having variable period lengths with increasing or decreasing periods.

13. Said optical wavelength demultiplexer device of claim 1, further comprising:

said Bragg reflection junction width and length shaped so that said output waveguide channel efficiently intercepts Bragg reflected light.

14. Said optical wavelength demultiplexer device of claim 1, further comprising:

electrically resistive thin-films laid over said Bragg gratings for thermally tuning the period lengths of each said Bragg grating, whereby the wavelength of Bragg reflected light is changed by heating said Bragg grating by applying electric current through said resistive thin-film.

15. Said optical wavelength demultiplexer device of claim 1, further comprising:

a plurality of second output waveguide channels, each corresponding to each of said output channels, a plurality of second junctions, each formed by merging said output waveguide channel and corresponding said second output waveguide channel at small acute angle, a plurality of second Bragg gratings, each fabricated at one of said plurality of second junctions, where said second Bragg grating angularly and spectrally reflects light of said selected wavelength propagating in said output waveguide channel into said second output waveguide channel, said second junctions and said second Bragg gratings forming second Bragg reflection junctions, an optical waveguide circuit for each wavelength of said input light, formed by said input channel, said Bragg reflection junction, said output channel, said second Bragg reflection junction, and said second output waveguide channel, said Bragg grating and said second Bragg grating in each said optical waveguide circuit reflect input light of the same wavelength, whereby light at each wavelength propagated in said second output waveguide channel is filtered spectrally a second time by Bragg reflections at said second Bragg grating, reducing any residual backscattered light at other wavelengths propagating in said output waveguide channel.

16. Said optical wavelength demultiplexer device of claim 15, further comprising:

each of said second Bragg reflection junction width and length shaped so that said second output channel efficiently intercepts Bragg reflected light.

17. A planar waveguide wavelength demultiplexing method for separating a plurality of different wavelengths of light propagating in an input waveguide channel into a plurality of output waveguide channels:

providing a plurality of junctions of long lengths formed by merging said input waveguide channel and said plurality of output waveguide channels at small acute angles, providing each said junction of long lengths at different positions along said input waveguide channel, providing Bragg grating of long length at each said junction, providing a plurality of said Bragg gratings having large number of periods due to said small acute merging angles, providing said Bragg grating of long length reflecting light of a selected wavelength with high efficiency into said output waveguide channel, whereby said input light in said input waveguide channel is efficiently separated spectrally in wavelengths by Bragg reflection by said Bragg gratings at said Bragg reflection junctions, with light at each wavelength directed into separate output waveguide channel.

18. Said planar waveguide wavelength demultiplexing method of claim 17, further:

providing a second spectral filtering of output for each wavelength by Bragg reflection by a second Bragg grating located at a Bragg reflection junction formed by each said output waveguide channel merging at small acute angles with second output waveguide channel, whereby output light at each wavelength in said output waveguide channel is spectrally double filtered by Bragg gratings for attenuating backscattered light at unwanted wavelengths.

19. Said planer waveguide wavelength demultiplexing method of claim 17, further:

providing each said Bragg reflection junction width and length shaped so that said output waveguide channel efficiently intercepts Bragg reflected light.

* * * * *